Figure 1:
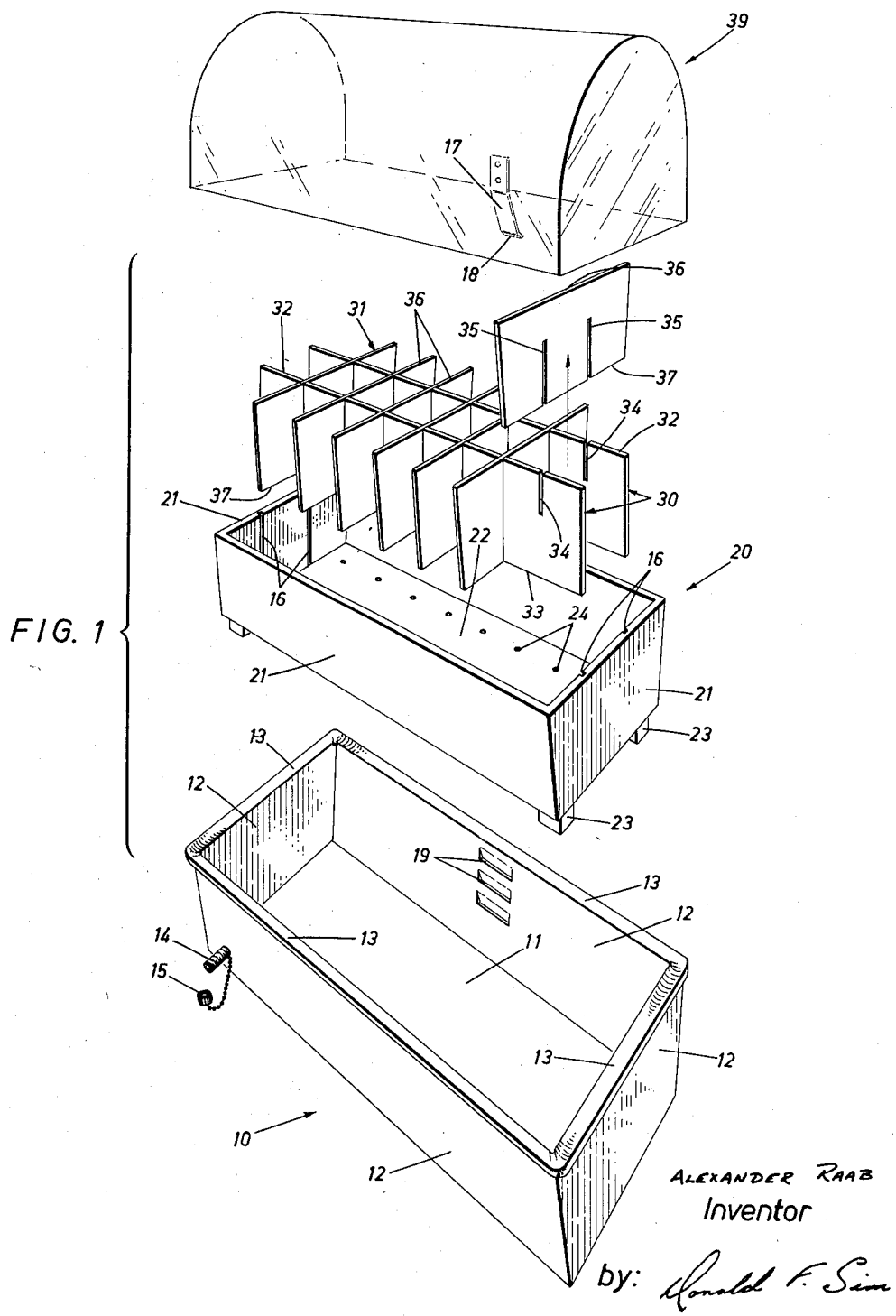

July 2, 1963

A. RAAB 3,095,670

SEED STARTER AND PLANT PROPAGATOR

Filed March 10, 1961

2 Sheets-Sheet 1

ALEXANDER RAAB
Inventor by: Ronald F. Sim

Attorney

July 2, 1963  A. RAAB  3,095,670
SEED STARTER AND PLANT PROPAGATOR
Filed March 10, 1961 2 Sheets-Sheet 2

ALEXANDER RAAB
Inventor by: Donald F. Sim
Attorney

United States Patent Office 3,095,670
Patented July 2, 1963

3,095,670
SEED STARTER AND PLANT PROPAGATOR
Alexander Raab, % White Rose Nurseries,
Unionville, Ontario, Canada
Filed Mar. 10, 1961, Ser. No. 94,815
1 Claim. (Cl. 47—17)

This invention relates to a device for seed starting and plant propagating. More particularly this invention relates to such a device which is self-watering. Even more particularly, this invention relates to such a device which permits careful control to be maintained of temperature and humidity conditions under which the seeds start and the plants propagate.

In the past, one practice which has been developed and is used extensively in growing plants from seeds is to set the seeds in long wooden boxes or trays full of earth. The seeds are placed just beneath the surface of the soil, and it has been the custom to water these seeds by the application of a spray from above. This method and apparatus has several serious disadvantages, some of which are, (a) excess water has no place to run off, (b) the water spray often disturbs the location of the seeds and, in some cases, buries them well below the surface where they will not germinate, and (c) it is difficult to determine precisely the correct amount of water required. Some of the disadvantages of such methods and apparatus have been obviated by devices which may be referred to as base and/or side wall water feeding receptacles for growing plants and which consist of an inner receptacle positioned within an outer receptacle, the receptacles being spaced apart to form a reservoir for water therebetween. The inner receptacle contains the soil and the plants to be watered. The water in the reservoir may be conducted to the soil by means of wicks extending into the reservoir and into the soil through the base of the inner receptacle. Alternatively, the side walls and/or the base of the inner receptacle may be porous, i.e. the side walls and base may be of naturally porous material, or the side walls and/or base may be perforated.

Devices of this type also have disadvantages, however. With such devices it is difficult to determine exactly when more water should be added to the reservoir. It is also not possible with such devices to control the humidity and temperature conditions in which the seed starts and the plants propagate. For this reason, such devices are used for household planters and usually contain plants therein which have matured considerably from the seed stage and which, therefore, being more hardy, need not be subjected to such carefully controlled conditions of temperature and humidity.

Accordingly, it is a primary object of my invention to provide a seed starter and plant propagator which overcomes at least some of the major disadvantages of prior art devices of the type hereinbefore mentioned.

More particularly, it is an object of my invention to provide a seed starter and plant propagator designed so that water is fed to the soil thereof by means other than being sprayed on the surface thereof.

It is another object of my invention to provide a seed starter and plant propagator in which the seeds and inner receptacle may be totally enclosed, thereby permitting humidity and temperature within the device to be carefully controlled.

An important object of my invention is to provide a totally enclosed seed starter and plant propagator having a transparent roof shaped so that moisture condensing thereon will not drop onto the seedlings, but will find its way back to a liquid reservoir in the device.

Yet a further important object of my invention is to provide a device of the class described which contains a plurality of dividers positioned in the soil, the dividers forming a number of individual seed starting and plant propagating receptacles.

Figure 2:
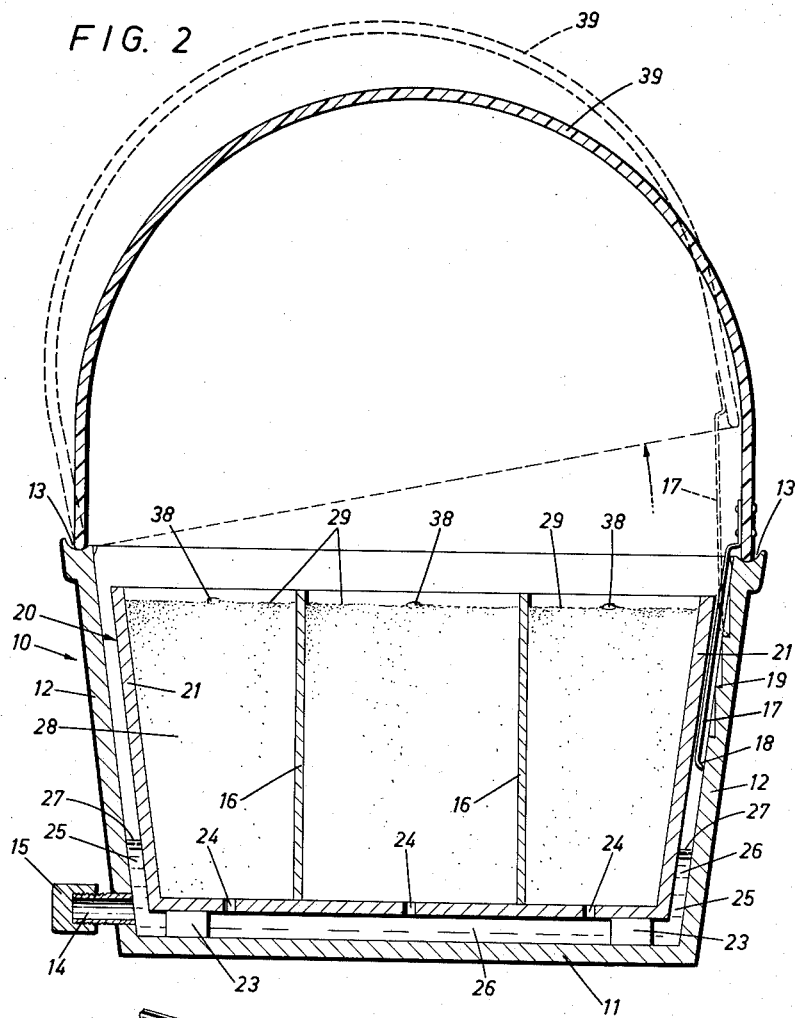
Figure 3:
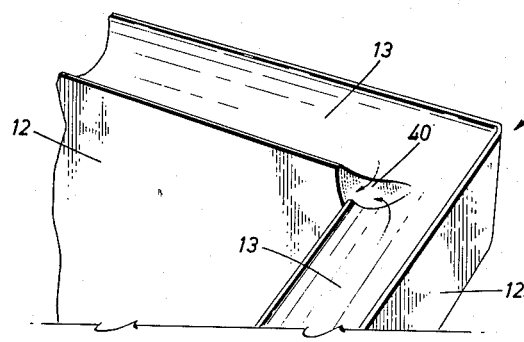

Numerous other objects and advantages of devices embodying my invention will become apparent from a consideration of the following disclosure taken in conjunction with the drawings, in which, FIGURE 1 is an exploded perspective view of an embodiment of my invention, FIGURE 2 is a section in assembled form of the embodiment shown in FIGURE 1, and FIGURE 3 shows the construction of one corner of the outer receptacle of a device embodying my invention.

Referring now to the drawings for a more detailed description of a seed starter and plant propagator embodying my invention, I have shown a generally rectangular, open-topped outer receptacle 10 having a base 11 and four side walls 12. Outer receptacle 10 is watertight and may be made from any suitable material such as, for example, plastic or metal. Positioned along the free edges of side walls 12 is an eaves-trough 13 which may be formed integral therewith, or may be formed separate thereform and affixed thereto by any suitable means. Connected to outer receptacle 10 adjacent one of the lower corners thereof is a drain pipe 14 having a detachable cap 15.

An inner receptacle 20 is positioned in outer receptacle 10. Inner receptacle 20 is generally rectangular in shape, open-topped, and has four side walls 21 and a base 22. Inner receptacle 20 is positioned in outer receptacle 10 in spaced-apart relationship therewith, base 22 of inner receptacle 20 being adjacent base 11 of outer receptacle 10, inner receptacle 20 being provided with spacing members or feet 23. Inner receptacle 20 has porous side walls and/or bases, i.e., the bases and/or side walls may be made of a naturally porous material or may contain a plurality of perforations or apertures extending therethrough, which may or may not contain wicks. In the embodiment of my invention shown in the drawings, inner receptacle 20 may be made of any suitable material such as plastic or metal, and the base thereof contains a plurality of apertures 24 extending therethrough. More than one inner receptacle may be employed if desired.

The space 25 between outer receptacle 10 and inner receptacle 20 forms a water reservoir. Water 26 fills this reservoir to a predetermined level 27 which may be marked on the inside surface of side walls 12.

Soil 28 fills inner receptacle 20 to a predetermined level 29 which may be marked on the inside surfaces of side walls 21.

Positioned adjacent the upper surface 29 of soil 28 and embedded therein are dividers 30 and 31. These dividers are best shown in FIGURE 1 and may be made of any suitable material such as plastic. Dividers 30 each have a top 32 and bottom 33 edge. Notches 34 are cut in dividers 30 from the top edges thereof to a point less than one-half through the dividers. Dividers 31 each have a top 36 and bottom 37 edge. Notches 35 are cut in dividers 31 from the bottom edges thereof to a point more than one-half through the dividers.

Dividers 30 are positioned in soil 28 with top edges 32 uppermost. Dividers 31 are positioned in soil 28 with their lower edges 37 remote from and beneath upper surface 29 of soil 28. The ends of dividers 30 are inserted in notches 16 in walls 21 of inner receptacle 20.

Dividers 30 form a set of parallel dividers, as do dividers 31, the two sets of dividers preferably intersecting one another at an angle of 90°. Notches 34 and 35 mate with one another to form an interlocking structure. It will be appreciated that notches 34 and 35 are of such lengths that, when dividers 30 and 31 are interlocked, upper edges 32 and 36 lie in a common plane and the dividers define a plurality of individual seed starting and plant propagating receptacles.

If seeds are to be germinated which will require larger individual receptacles, every second divider 31 may be removed, thereby providing larger individual seed starting and plant propagating receptacles. Under such conditions, it will be seen that it is important that notches 34 be adjacent soil surface 29 and be cut less than half-way through dividers 30. If this were not the case, the roots of the seeds could readily pass through the unoccupied notches 34 into adjacent receptacles, thereby defeating the purpose of employing dividers.

In the embodiment of my invention illustrated the ends of dividers 30 engage the two outer notches 16 in each end wall 21 of inner receptacle 20. If individual seed starting and plant propagating receptacles of different dimensions are desired only one divider 30 may be used, this divider engaging the central notches 16. Under these circumstances centrally notched dividers 31 would have to be employed.

As shown in FIGURE 2, seeds 38 are firmly pressed into the upper surface of soil 28, one seed in each seed starting and plant propagating receptacle.

A roof 39 of transparent material such as, for example, styrene is positioned over inner receptacle 20 and, with outer receptacle 10 forms an enclosure completely enclosing inner receptacle 20. In accordance with my invention, the inner surface of at least the portion of roof 39 over inner receptacle 20 is smoothly curved. This is an important feature of my invention, inasmuch as water condensing on the inner surface of roof 39 will not drop onto seeds 38, but will run down the inner surface of roof 39 into trough 13, and thence into the water reservoir as shown in FIGURE 2. A device of the type shown in U.S. Patent 2,798,335, issued July 9, 1957, E. F. Downey is not acceptable in this regard inasmuch as it has a peaked roof, and it will be apparent from a consideration of the device shown in this patent that condensation drops forming at this peak, and on the various ridges thereabouts, would fall directly on the soil and seeds therebeneath.

In the embodiment of my invention shown in the drawings, roof 39 is semi-cylindrical in shape. It will be appreciated, however, that the roof may assume other shapes consistent with achieving the desired result of preventing any substantial amount of condensed water from falling directly into inner receptacles 20.

It will be seen from a consideration of the drawings that the free edges of roof 39 are positioned in trough 13. A spring finger 17 is connected to roof 39 and has a lip 18 depending therefrom which is adapted to engage notches 19 provided on the inner surface of one wall 12 of outer receptacle 10. By these means roof 39 may be supported in a raised position as shown in dotted outlines in FIGURE 2.

In order to use a device embodying my invention, roof 39 is removed, dividers 30 and 31 are inserted in receptacle 20 to form individual seed starting and plant propagating receptacles which then are filled with soil 28 to level 29. Seeds 38 are pressed into soil 28, one in each individual receptacle. Water 26 then is introduced into the reservoir to a predetermined level 27. Roof 39 is replaced, and soil 28 permitted to soak up this water through apertures 24. Excess water in the reservoir may be drained off by removing cap 15.

When the device is placed in sunlight, both the humidity and temperature within the device will rise, and water vapour will condense on the inner surface of roof 39. This water vapour runs along the inside surface of roof 39 into trough 13, and eventually returns to the reservoir by drainage from troughs 13 through channels 40 (FIGURE 3) provided at the corners of outer receptacle 10. Means may be incorporated in the device to visibly indicate both temperature and humidity. Air may be let into the device to control temperature and humidity by lifting the front edge of roof 39 and permitting lip 18 of spring finger 17 to engage one of notches 19. Thus roof 39 may be considered to have its rear free edge in FIGURES 1 and 2 hingedly supported in trough 13.

Once plants begin to grow from seeds 38, it will generally be necessary to so lift roof 39.

After the plants have sufficiently matured so that they can be removed from the device, dividers 30 and 31 are withdrawn, thereby permitting each separate plant to be readily removed. Dividers 30 and 31 prevent intermingling of the roots of adjacent plants and are much more efficient from a space saving and cost point of view than small, individual, circular flower pots which are sometimes employed for the same purpose.

While I have described a preferred embodiment of my invention, it will be appreciated that numerous changes and modifications may be made therein without departing from the spirit and scope of my invention as defined in the appended claim.

What I claim as my invention is:

A seed starter and plant propagator comprising an open-topped, outer receptacle having side walls and a base, an open-topped, inner receptacle having side walls and a base and positioned within said outer receptacle in spaced apart relationship therewith, said base of said inner receptacle being adjacent said base of said outer receptacle, said inner receptacle being adapted to receive soil therewithin, the space between said inner receptacle and said outer receptacle being adapted to receive water therewithin, at least portions of said inner receptacle being porous, whereby water in said space may be absorbed by the soil, means for draining water from said space, and a roof of transparent material positione dover said inner receptacle and, with said outer receptacle, forming an enclosure completely enclosing said inner receptacle, the inner surface of at least the portion of said roof over said inner receptacle being smoothly and uninterruptedly curved, at least one first divider removably located in said inner receptacle, at least one second divider removably located in said inner receptacle, said first divider having at least one notch therein extending from the top edge of said first divider toward the bottom edge thereof to a point less than one-half way through said first divider, said second divider having at least one notch therein extending from the bottom edge of said second divider toward the top edge thereof, said first and second dividers being angularly interlocked with said first divider being inserted into said notch in said second divider and said second divider being inserted into said notch in said first divider, whereby a plurality of individual seed starting and plant propagating receptacles are formed, said top edges of said first and second dividers being positioned contiguous to the open top of said inner receptacle and lying in substantially the same plane, said bottom edges of said first and second dividers resting on said base of said inner receptacle.

References Cited in the file of this patent

UNITED STATES PATENTS

| | | |
|---|---|---|
| 61,479 | Smith | Jan. 22, 1867 |
| 84,955 | Manchester | Dec. 15, 1868 |
| 1,312,509 | Schurmann | Aug. 5, 1919 |
| 1,783,007 | Alland | Nov. 25, 1930 |
| 1,865,960 | Regelson | July 5, 1932 |
| 2,138,188 | Morley | Nov. 29, 1938 |
| 2,950,567 | Newman | Aug. 30, 1960 |
| 3,006,818 | Lappalla et al. | Oct. 31, 1961 |

FOREIGN PATENTS

| | | |
|---|---|---|
| 1,013,165 | France | July 23, 1952 |
| 1,111,287 | France | Feb. 24, 1956 |
| 306,018 | Italy | Feb. 22, 1933 |